United States Patent
Kaltenbach et al.

(10) Patent No.: US 9,463,687 B2
(45) Date of Patent: Oct. 11, 2016

(54) METHOD FOR OPERATING A DRIVE UNIT FOR A HYBRID VEHICLE

(71) Applicant: ZF Friedrichshafen AG, Friedrichshafen (DE)

(72) Inventors: Johannes Kaltenbach, Friedrichshafen (DE); Uwe Griesmeier, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/443,216

(22) PCT Filed: Oct. 10, 2013

(86) PCT No.: PCT/EP2013/071166
§ 371 (c)(1),
(2) Date: Oct. 20, 2015

(87) PCT Pub. No.: WO2014/075853
PCT Pub. Date: May 22, 2014

(65) Prior Publication Data
US 2016/0052381 A1 Feb. 25, 2016

(30) Foreign Application Priority Data
Nov. 15, 2012 (DE) .......................... 10 2012 220 828

(51) Int. Cl.
*B60K 1/02* (2006.01)
*B60K 6/365* (2007.10)
(Continued)

(52) U.S. Cl.
CPC .................. *B60K 6/365* (2013.01); *B60K 6/38* (2013.01); *B60K 6/387* (2013.01); *B60K 6/48* (2013.01);
(Continued)

(58) Field of Classification Search
CPC ........ B60K 6/442; B60K 6/445; B60K 1/02; B60W 20/00; B60W 10/08
See application file for complete search history.

(56) References Cited

U.S. PATENT DOCUMENTS 8,075,436 B2  12/2011  Bachmann 8,109,856 B2 *  2/2012  Kaltenbach .............. B60K 6/48
                                                     180/65.285

(Continued)

FOREIGN PATENT DOCUMENTS

DE          102 28 636 A1      4/2003
DE     10 2006 059 591 A1      6/2008

(Continued)

OTHER PUBLICATIONS

PCT Search Report and Written Opinion, Dec. 4, 2013.

(Continued)

*Primary Examiner* — John Walters
*Assistant Examiner* — James Triggs
(74) *Attorney, Agent, or Firm* — Dority & Manning, P.A.

(57) ABSTRACT

A method is provided for operating a drive unit for a hybrid vehicle. The drive unit includes a drive assembly with an internal combustion engine, and an electric motor, and a transmission featuring several sub-transmissions shifting between the drive assembly and an output. Through a planetary transmission, the electric motor is coupled to an input shaft of a first sub-transmission and an input shaft of a second sub-transmission shifted in parallel to the first sub-transmission. Through a frictional-locking separating clutch, the internal combustion engine couples to the input shaft of the first sub-transmission and, if the separating clutch is locked, is coupled to the same element of the planetary transmission together with the input shaft of the first sub-transmission. A positive-locking or frictional-locking bypass shift element works together with the planetary transmission such that, with a locked bypass shift element, a torque-proof connection between the electric motor, the input shaft of the first sub-transmission, and the input shaft of the second sub-transmission, and thus a mandatory equality of rotational speed between the same, exists. With an open bypass shift element, this torque-proof connection and thus the equality of rotational speed, do not exists. For the execution of a power shift, prior to the engagement of a positive-locking shift element to be locked for the power shift, the frictional-locking separating clutch is brought into slip for the decoupling of the inertial mass of the internal combustion engine.

8 Claims, 4 Drawing Sheets

(51) Int. Cl.

| | |
|---|---|
| *B60K 6/387* | (2007.10) |
| *B60K 6/48* | (2007.10) |
| *B60W 10/02* | (2006.01) |
| *B60W 10/06* | (2006.01) |
| *B60W 10/08* | (2006.01) |
| *B60W 10/113* | (2012.01) |
| *B60W 20/00* | (2016.01) |
| *F16H 3/72* | (2006.01) |
| *B60K 6/38* | (2007.10) |
| *B60K 6/547* | (2007.10) |
| *F16H 3/00* | (2006.01) |
| *F16H 37/04* | (2006.01) |

(52) U.S. Cl.
CPC .............. *B60K 6/547* (2013.01); *B60W 10/02* (2013.01); *B60W 10/06* (2013.01); *B60W 10/08* (2013.01); *B60W 10/113* (2013.01); *B60W 20/00* (2013.01); *B60W 20/40* (2013.01); *F16H 3/725* (2013.01); *B60K 2006/4816* (2013.01); *F16H 37/046* (2013.01); *F16H 2003/007* (2013.01); *F16H 2003/008* (2013.01); *F16H 2200/0052* (2013.01); *Y02T 10/6221* (2013.01); *Y02T 10/6256* (2013.01); *Y02T 10/6286* (2013.01); *Y10S 903/902* (2013.01)

(56) References Cited

U.S. PATENT DOCUMENTS

| | | |
|---|---|---|
| 8,251,866 B2 | 8/2012 | Kaltenbach |
| 8,494,739 B2 | 7/2013 | Falkenstein |
| 8,684,875 B2 | 4/2014 | Kaltenbach et al. |
| 2003/0045389 A1 | 3/2003 | Kima |
| 2012/0129638 A1 | 5/2012 | Kaltenbach et al. |
| 2012/0135838 A1* | 5/2012 | Cuppers ................ B60W 10/06 477/77 |
| 2013/0288850 A1 | 10/2013 | Kaltenbach |

FOREIGN PATENT DOCUMENTS

| | | |
|---|---|---|
| DE | 10 2007 038 771 A1 | 2/2009 |
| DE | 10 2007 042 949 A1 | 4/2009 |
| DE | 10 2008 001 144 A1 | 10/2009 |
| DE | 10 2010 030 569 A1 | 12/2011 |
| DE | 10 2010 046 766 A1 | 3/2012 |
| DE | 10 2010 061 824 A1 | 5/2012 |
| DE | 10 2010 063 582 A1 | 6/2012 |

OTHER PUBLICATIONS

German Patent Office Search Report, Aug. 22, 2013.

* cited by examiner

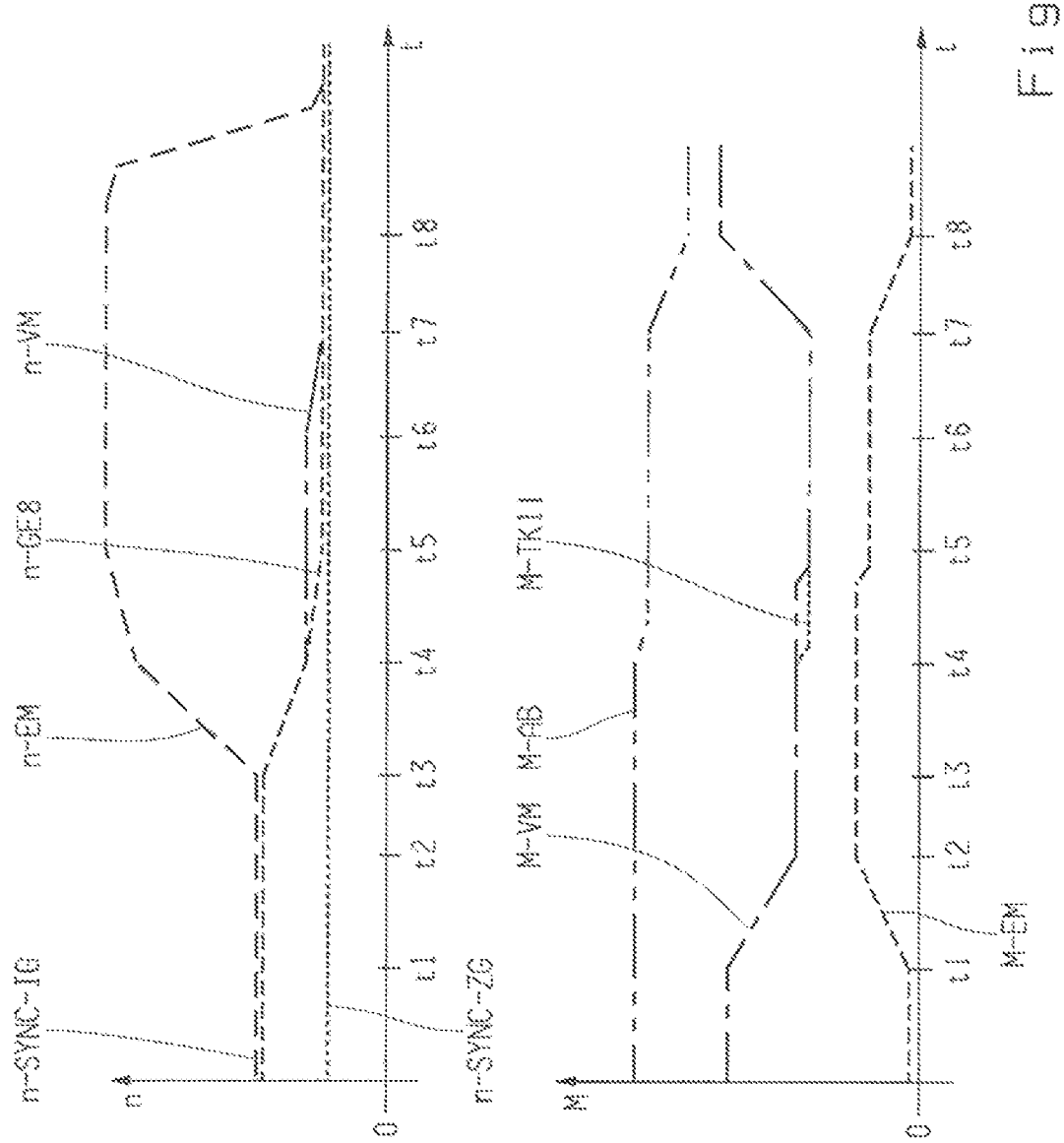

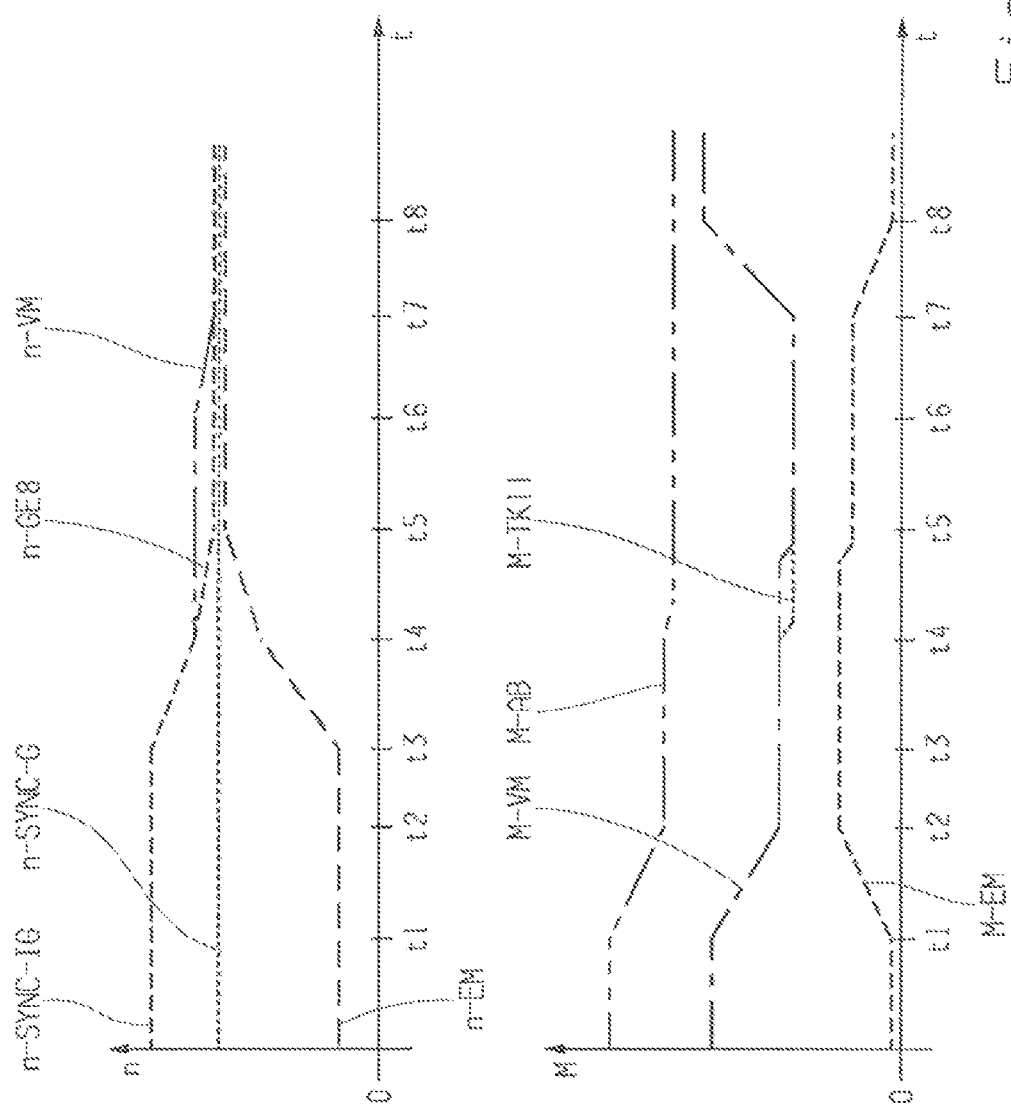

METHOD FOR OPERATING A DRIVE UNIT FOR A HYBRID VEHICLE

FIELD OF THE INVENTION

The invention relates to a method for operating a drive unit for a hybrid vehicle.

BACKGROUND

A drive unit for a hybrid vehicle is known from DE 10 2006 059 591 A1, whereas the drive unit comprises a drive assembly with an internal combustion engine and an electric motor and a transmission shifting between the drive assembly and an output. The transmission is designed as a dual-clutch transmission and includes several sub-transmissions. Through a planetary transmission, the electric motor of the drive assembly of the drive unit is coupled to an input shaft of a first sub-transmission and an input shaft of a second sub-transmission shifted in parallel to the first sub-transmission. Through a frictional-locking separating clutch, the internal combustion engine is able to be coupled to the input shaft of the first sub-transmission and, if the separating clutch is locked, is directly coupled to the input shaft of one of the sub-transmissions.

An additional drive unit for a hybrid vehicle is known from DE 10 2010 061 824 A1, whereas the drive unit of DE 10 2010 061 824 A1 is distinguished from the drive unit of DE 10 2006 059 591 A1 by the fact that a positive-locking bypass shift element is also present, which works together with the planetary transmission in such a manner that, with a locked bypass shift element, there is a torque-proof connection between the electric motor, the input shaft of the first sub-transmission and the input shaft of the second sub-transmission, whereas, with an open bypass shift element, this connection between the electric motor and the two input shafts of the two sub-transmissions does not exist.

With the drive units known from the state of the art, if a power shift is to be carried out from an actual gear of one sub-transmission into a target gear of a different sub-transmission, this can lead to a transient shift impact, which is considered to be uncomfortable.

As such, there is a need for a method for operating a drive unit for a hybrid vehicle, with which, for the execution of power shifts, an uncomfortable transient shift impact can be safely and reliably avoided.

SUMMARY

Based on this, the present invention is subject to a task of creating a new method for operating a drive unit for a hybrid vehicle. Additional objects and advantages of the invention will be set forth in part in the following description, or may be obvious from the description, or may be learned through practice of the invention.

In accordance with the invention, for the execution of a power shift, shortly prior to the engagement of a positive-locking shift element to be locked for the power shift, the frictional-locking separating clutch is brought into slip for the decoupling of the inertial mass of the internal combustion engine.

In accordance with the invention, it is proposed to, for the execution of a power shift, shortly prior to the engagement of a positive-locking shift element to be locked for the power shift, the frictional-locking separating clutch is brought into slip, in order to decouple the inertial mass of the internal combustion engine. If the target gear of the shift to be executed lies at the first sub-transmission, through which, with a locked frictional-locking shift element, the internal combustion engine is directly coupled, this takes place prior to engagement of the shift element to be locked in the first sub-transmission. Then, if the target gear of the power shift to be executed lies at the second sub-transmission, to which, with a locked frictional-locking element, the internal combustion engine is indirectly coupled through the planetary transmission, this takes place shortly prior to the engagement or locking of the bypass shift element. In each case, the inertial mass of the internal combustion engine, including a torsional damper, can be decoupled upon the execution of a power shift, by which it is possible to avoid an uncomfortable transient shift impact.

According to an additional form of the invention, upon the execution of the power shift, the rotational speed of the internal combustion engine and/or the rotational speed of the electric motor are further adjusted prior to the build-up of slip at the frictional-locking separating clutch in such a manner that, upon the starting slip at the frictional-locking separating clutch, the positive-locking shift element to be locked for the power shift is automatically synchronized.

In traction mode, the rotational speed of the input shaft of the first sub-transmission automatically decreases if the ability to transfer of the frictional-locking separating clutch is reduced. In coasting mode, the rotational speed of the input shaft of the first sub-transmission automatically increases if the ability to transfer of the frictional-locking separating clutch is reduced. With the additional form, comfort upon the execution of a power shift can be further increased.

If the bypass shift element is formed as a positive-locking or frictional-locking bypass shift element, and if the actual gear of the power shift to be executed lies at the second sub-transmission and the target gear of the power shift to be executed lies at the first sub-transmission, to which, with a locked separating clutch, the internal combustion engine is directly connected, the following steps are carried out for the execution of the power shift:

a) initially, through a change to the load at the internal combustion engine and the electric motor, the locked bypass shift element is made load-free and is then opened without load;

b) subsequently, through a change to the rotational speed under load at the internal combustion engine and the electric motor, the rotational speed of the input shaft of the first sub-transmission is changed in the direction of the synchronous rotational speed of the target gear;

c) thereupon, through the reduction in the ability to transfer of the frictional-locking separating clutch, the same is brought into slip;

d) subsequently, with a synchronized positive-locking shift element of the first sub-transmission, to be locked for the power shift, the target gear is engaged;

e) thereupon, at the frictional-locking separating clutch, the slip is reduced and the same is locked;

f) subsequently, a change to the load preferably takes place at the internal combustion engine and the electric motor, and the actual gear of the second sub-transmission is disengaged without load.

If the bypass shift element is formed as a positive-locking bypass shift element, and if the actual gear of the power shift to be executed lies at the first sub-transmission and the target gear of the power shift to be executed lies at the second sub-transmission, to which, with a locked separating clutch, the internal combustion engine is connected indirectly through the planetary transmission, the following steps are carried out for the execution of the power shift:

a) initially, through a change to the load at the internal combustion engine and the electric motor, the shift element of the first sub-transmission to be disengaged for the power shift is made load-free and is then opened without load;

b) subsequently, through a change to the rotational speed under load at the internal combustion engine and the electric motor, the rotational speed of the input shaft of the first sub-transmission is changed in the direction of the synchronous rotational speed of the target gear;

c) thereupon, through the reduction in the ability to transfer of the frictional-locking separating clutch, the same is brought into slip;

d) subsequently, with a synchronized positive-locking bypass shift element, the same is locked;

e) thereupon, at the frictional-locking separating clutch, the slip is reduced and the same is locked;

f) subsequently, a change to the load preferably takes place at the internal combustion engine and the electric motor.

Both of the above shifting sequences of a power shift to be executed are able to be carried out automatically. Uncomfortable transient shift impacts can be safely and reliably avoided upon the execution of the respective power shift.

BRIEF DESCRIPTION OF THE DRAWINGS

Preferred additional forms arise from the sub-claims and the following description. Embodiments of the invention are, without any limitation, more specifically described by means of the drawing. Thereby, the following is shown:

FIG. 3 a diagram for the illustration of a first method in accordance with the invention for operating the drive unit in accordance with FIG. 1 or the drive unit in accordance with FIG. 2; and FIG. 4 a diagram for the illustration of a second method in accordance with the invention for operating the drive unit in accordance with FIG. 1.

DETAILED DESCRIPTION

Figure 1:
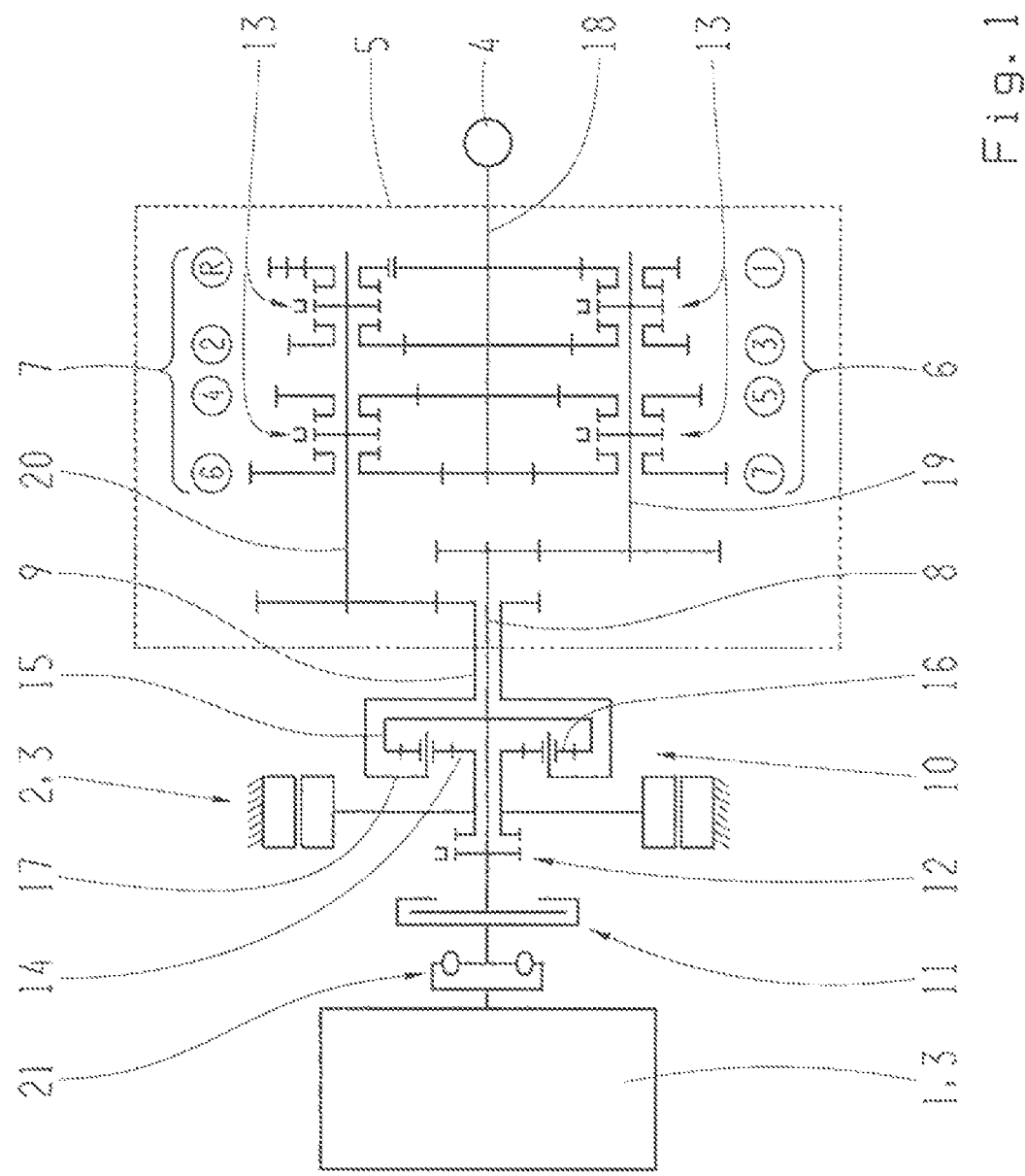
FIG. 1 a schematic diagram of a first drive unit for a hybrid vehicle to be operated in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a schematic diagram of a drive unit for a hybrid vehicle. The drive unit of FIG. 1 includes a drive assembly 3 formed by an internal combustion engine 1 and an electric motor 2, whereas a transmission 5 is shifted between the drive assembly 3 and an output 4. The transmission 5 includes two sub-transmissions 6 and 7, which shift, for all intents and purposes, parallel to each other, whereas, in the embodiment shown, the first sub-transmission 6 provides the forward gears "1", "3", "5" and "7", while the second sub-transmission 7 provides the forward gears "2", "4", "6", and the reverse gear "R". The gear set shown in FIG. 1 of the sub-transmission 6 and 7 and the shown distribution of gears on the same is of an exemplary nature.

For providing the forward gears and the reverse gear, the sub-transmissions 6 and 7 of the transmission 5 include positive-locking shift elements 13, which are also designated as gear shifting elements. The structure and the arrangement of the sub-transmissions 6 and 7 are known from dual-clutch transmissions and are familiar to the specialist.

It should only be noted that each sub-transmission 6, 7 includes input shafts 8, 9, which, depending on the shifting state of the shift elements 13, are selectively coupled through an output shaft 18 with the output 4. An input shaft 9 of the sub-transmission 7 is designed as a hollow shaft, in which the other input shaft 8 of the other sub-transmission 6 runs in a coaxial manner. The shift elements 13 of the sub-transmissions 6 and 7 are allocated to lay shafts 19 and 20 of the sub-transmissions 6 and 7.

Through a planetary transmission 10, the electric motor 2 of the drive assembly 3 engages at an input shaft 8 of the first sub-transmission 6 and at an input shaft 9 of the second sub-transmission 7. On the input shaft 8 of the first sub-transmission 6, the internal combustion engine 1 of the drive assembly 3 is able to be directly coupled through a frictional-locking separating clutch 11, whereas, with a locked separating clutch 11, through the planetary transmission 10, the internal combustion engine 1 is further indirectly coupled to the input shaft 9 of the second sub-transmission 7.

A torsional damper 21 is shifted between the frictional-locking separating clutch 11 and the internal combustion engine 1.

Of the planetary transmission 10, a sun gear 14, a ring gear 15, planetary gears 16 and a bar or planetary carrier 17 are shown in FIG. 1. The planetary carrier 17 engages at the input shaft 9 of the second sub-transmission 7. The electric motor 2 of the drive assembly 3 is coupled to the sun gear 14 of the planetary transmission 10. With a locked separating clutch 11, the internal combustion engine 1, as with the input shaft 8 of the first sub-transmission 6, is coupled to the ring gear 15. The connection of the internal combustion engine 1, the electric motor 2 and the second sub-transmission 7 to the planetary transmission 10 may also differ from the variant shown in FIG. 1. For example, the electric motor 2 may engage at the ring gear 15 and the internal combustion engine 1 with a locked separating clutch 11, just as the input shaft 8 of the first sub-transmission 6 engages at the sun gear 14. With a locked separating clutch 11, the internal combustion engine 1 and the input shaft 8 of the first sub-transmission 6 always engage at the same element of the planetary transmission 10.

A bypass shift element 12 works together with the planetary transmission 10 in such a manner that, with a locked bypass shift element 12, a torque-proof connection between the electric motor 2, the input shaft 9 of the second sub-transmission 7 and the input shaft 8 of the first sub-transmission 6, and thus a mandatory equality of rotational speed between the same, exist, while, with an open bypass shift element 12, this torque-proof connection between the electric motor 2 and the two input shafts 8, 9 of the two sub-transmissions 6, 7, and thus the mandatory equality of rotational speed, do not exist.

Figure 2:
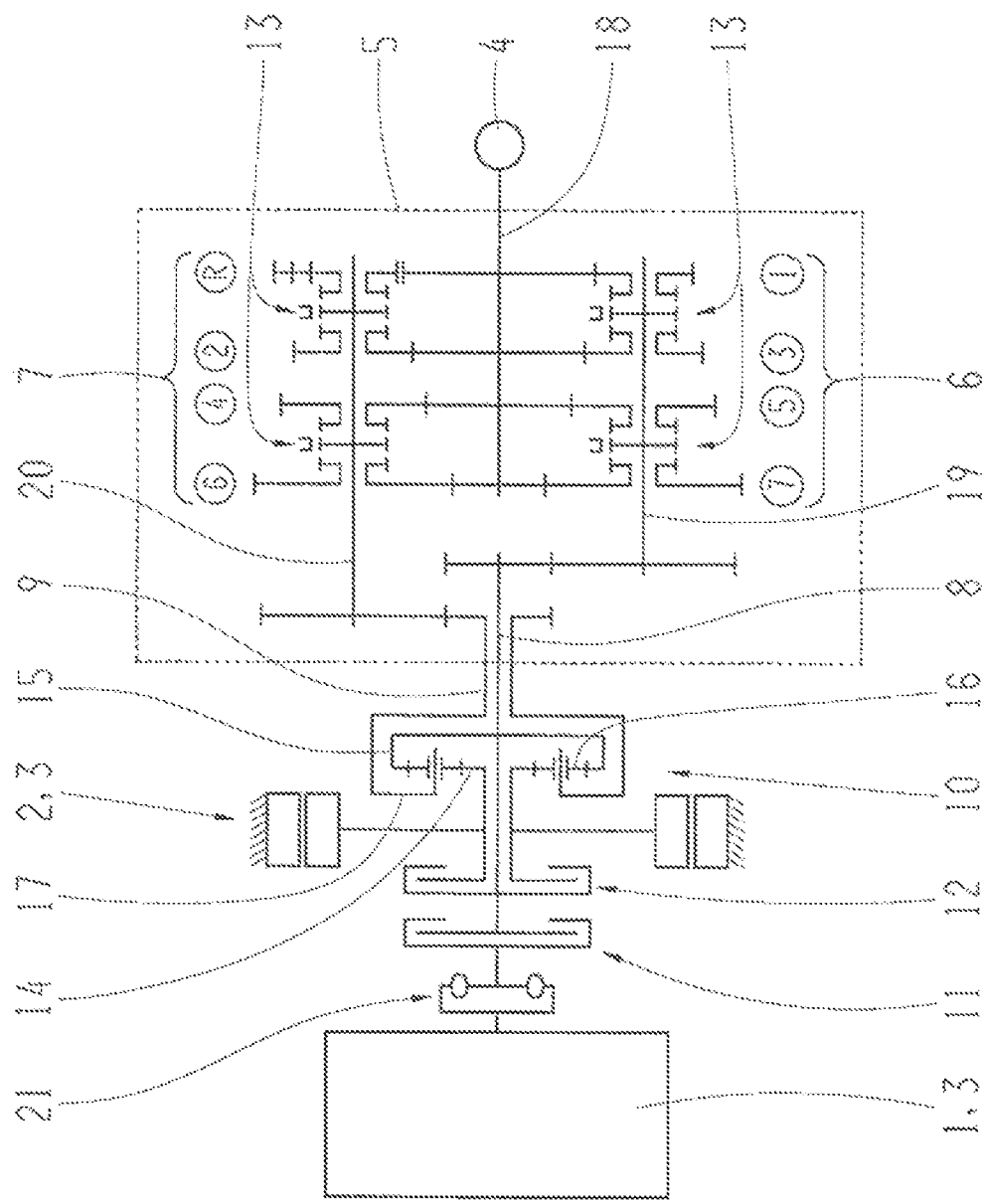
FIG. 2 a schematic diagram of a second drive unit for a hybrid vehicle to be operated in accordance with the invention.

Under FIG. 1, the bypass shift element 12 comprises a positive-locking shift element. FIG. 2 shows a variant in which the bypass shift element 12 is designed as a frictional-locking shift element. With respect to all remaining details, FIGS. 1 and 2 match.

The present invention relates to a method, with the assistance of which, upon the execution of a power shift, for the drive units for a hybrid vehicle shown in FIGS. 1 and 2, transient shift impacts can be safely and reliably avoided.

For this purpose, upon the execution of the power shift, shortly prior to the engagement of a positive-locking shift element to be locked for the power shift, the frictional-locking separating clutch 11 is brought into slip for the decoupling of the inertial mass of the internal combustion engine 1 and the torsional damper 21.

Preferably, prior to the build-up of slip at the frictional-locking separating clutch 11, the rotational speed of the internal combustion engine 1 and/or the rotational speed of the electric motor 2 is adjusted such that, upon the starting slip at the frictional-locking separating clutch 11, the positive-locking shift element to be locked for the power shift is automatically synchronized. Thereby, a particularly comfortable power shift that is free of transient shift impacts can be carried out.

Additional details of the invention are described below with reference to the diagrams of FIGS. 3 and 4, whereas, in the diagrams of FIGS. 3 and 4, chronological curves of torques M and rotational speeds n are shown over time t.

Thus, the torque M-EM of the electric motor 2, the torque M-VM of the internal combustion engine 1, the torque M-AB taking effect at the output 4 along with the torque M-TK 11 transferable by the frictional-locking separating clutch 11 are shown as chronological torque curves. The rotational speed n-EM of the electric motor 2, the rotational speed n-VM of the internal combustion engine 1, the synchronous rotational speed of the actual gear n-SYNC-IG, the synchronous rotational speed of the target gear n-SYNC-ZG along with the rotational speed n-GE 8 of the transmission input shaft 8 of the first sub-transmission 6 are shown as chronological rotational speed curves.

FIG. 3 concerns the case of a power shift process, in which the actual gear of the shift to be executed lies at the second sub-transmission 7 and the target gear of the power shift to be executed lies at the first sub-transmission 6, whereas, upon a locked separating clutch 11, the internal combustion engine 1 is directly connected to the input shaft 8 of the first sub-transmission 6.

In the initial state of the power shift process of FIG. 3, thus prior to the point in time t1, accordingly, one gear is engaged in the second sub-transmission 7, both the bypass shift element 12 and the separating clutch 11 are locked and the first sub-transmission 6 is in neutral. It is thereby assumed that, during the entire shift, the torque required by the driver and the driving speed remain constant. The synchronous rotational speeds n-SYNC refer to the rotational speed of the input shaft 8 of the first sub-transmission 6, which is adjusted if the corresponding gear is effective. Prior to the point in time t1, the internal combustion engine 1 and the electric motor 2 have the same rotational speeds n-EM and n-VM. The planetary transmission 10 is in the block cycle.

For the execution of the power shift of the actual gear of the second sub-transmission 7 to the target gear of the first sub-transmission 6, between the points in time t1 and t2, a change to the load of the torques M-VM and M-EM at the internal combustion engine 1 and the electric motor 2 initially takes place, specifically in such a manner that the locked bypass shift element 12 is made load-free and is accordingly without load. Thereby, the torque M-AB taking effect at the output is kept constant. Subsequently, the bypass shift element 12, which is now load-free, is opened without load between the points in time t2 and t3.

Subsequently, between the points in time t3 and t4, the rotational speed n-EM is the electric motor 2 and the rotational speed n-VM of the internal combustion engine 1 are adjusted under load in such a manner that the rotational speed n-GE 8 of the input shaft 8 of the first sub-transmission 6 is changed to the synchronous rotational speed n-SYNC-ZG of the target gear to be engaged. In traction mode, as shown in FIG. 3, this rotational speed n-GE 8 of the input shaft 8 of the first sub-transmission 6 is above the synchronous rotational speed n-SYNC-ZG of the target gear to be engaged. In contrast, in coasting mode, the rotational speed n-GE 8 would be below the synchronous rotational speed n-SYNC-ZG of the target gear.

After the above adjustment to the rotational speeds of the electric motor 2 and the internal combustion engine 1, between the points in time t4 and t5, the ability to transfer of the frictional-locking separating clutch 11 decreases, specifically for such a period until a slip builds up at the separating clutch 11. Thereby, the rotational speed n-GE 8 of the input shaft 8 of the first sub-transmission 6 then decreases, because the frictional-locking clutch 11 now transfers less torque. Such change to the rotational speed of the rotational speed n-GE 8 in the direction of the synchronous rotational speed n-SYNC-ZG takes place automatically. The rotational speed n-VM of the internal combustion engine 1 is kept roughly constant in order to prevent the rotational speed of the internal combustion engine 1 from increasing, whereas this takes place by decreasing the torque M-VM of the internal combustion engine 1.

Subsequently, between the points in time t5 and t6, for the synchronized positive-locking shift element or gear shift element 13 of the first sub-transmission 6 to be locked for the power shift, the target gear is engaged in the first sub-transmission 6. Since the frictional-locking separating clutch 11 is in slip, the inertial mass of the internal combustion engine 1 along with the torsional damper 21 is decoupled, and the engagement of the target gear takes place comfortably and in a manner gentle on the components, without transient shift impact. Only a little heat is generated at the frictional-locking separating clutch 11, because the differential rotational speed at the clutch 11 is low.

Thereupon, between the points in time t6 and t7, the frictional-locking clutch 11 is locked, by reducing slip on the same. This can take place by increasing the transferable torque at the frictional-locking separating clutch 11 or by decreasing the torque M-VM provided by the internal combustion engine 1.

Subsequently, a change to the load at the internal combustion engine 1 and at the electric motor 2 takes place, specifically by increasing the torque M-VM provided by the internal combustion engine 1 and by decreasing the torque M-EM provided by the electric motor 2, whereas, after the point in time t8, the actual gear is disengaged without load in the second sub-transmission 7. In addition, after the point in time t8, a synchronization of the rotational speed of the electric motor 2 to the rotational speed of the internal combustion engine 1 takes place, whereas the planetary transmission 10 is then in the block cycle, whereas the bypass shift element 12 is subsequently locked.

The method described with reference to FIG. 3 accordingly serves the purpose of executing a power shift from an actual gear of the second sub-transmission 7 to a target gear of the first sub-transmission 6, whereas FIG. 3 shows this with the example of a drive upshift.

The method of FIG. 3 may be used for both the drive unit of FIG. 1 and the drive unit of FIG. 2, thus even if the bypass shift element 12 is designed as a positive-locking bypass shift element or a frictional-locking bypass shift element.

A further specification of the method in accordance with the invention is described below with reference to FIG. 4, whereas FIG. 4 concerns a power shift from an actual gear of the first sub-transmission 6 to a target gear of the second sub-transmission 7, specifically in turn for the case of a drive upshift. The method of FIG. 4 is only relevant for the drive unit of FIG. 1, in which the bypass shift element 12 is designed as a positive-locking bypass shift element.

In FIG. 4, a power shift from an actual gear of the first sub-transmission 6 to a target gear of the second sub-transmission 7 is to be carried out accordingly, whereas, with a locked frictional-locking separating clutch 11, the internal combustion engine 1 is connected to the second sub-transmission 7 indirectly through the planetary transmission 10. Prior to the point in time t1, driving takes place through the internal combustion engine 1 with the actual gear engaged in the first sub-transmission 6, whereas the bypass shift element 12 is open and, in the second sub-transmission 7, the target gear of the power shift to be executed has been engaged without load through synchronization with the electric motor 2. The synchronous rotational speeds n-SYNC-IG and n-SYNC-SG in turn refer to the rotational speed of the input shaft 8 of the first sub-transmission 6, which is adjusted if the corresponding gear is effective.

Between the points in time t1 and t2, a change to the load at the internal combustion engine 1 and at the electric motor 2 initially takes place, here by decreasing the torque M-MV of the internal combustion engine 1 and by increasing the torque M-EM of the electric motor 2, by which the shift element 13 to be disengaged in the first sub-transmission 6 is load-free.

Subsequently, between the points in time t2 and t3, the shift element 13 to be disengaged in the first sub-transmission 6 is disengaged or opened without load.

Subsequently, between the points in time t3 and t4, an adjustment to the rotational speeds n-EM and n-VM of the electric motor 2 and the internal combustion engine 1 takes place under load, specifically in such a manner that the rotational speed n-GE8 of the input shaft 8 of the first sub-transmission 6 approximates the synchronous rotational speed n-SYNC-ZG of the target gear to be engaged. In traction mode, such rotational speed n-GE8 of the input shaft 8 of the first sub-transmission 6 is above the synchronous rotational speed n-SYNC-ZG of the target gear, as this is shown in FIG. 4. In coasting mode, the rotational speed n-GE 8 would be below the synchronous rotational speed n-SYNC-ZG.

Thereupon, between the points in time t4 and t5, a decrease in the ability to transfer of the frictional-locking separating clutch 11 takes place, specifically for such a period until a slip is formed at the same. Thereby, the rotational speed n-GE8 of the input shaft 8 of the first sub-transmission 6 decreases, since the frictional-locking separating clutch 11 then transfers less torque. The rotational speed n-VM of the internal combustion engine 1 is kept approximately constant, by decreasing the torque M-VM provided by the internal combustion engine 1, in order to prevent the rotational speed n-VM of the internal combustion engine 1 from increasing.

Subsequently, between the points in time t5 and t6, if there are synchronous conditions at the bypass shift element 12 to be engaged for the power shift, the bypass shift element 12 is locked or engaged. Since the frictional-locking separating clutch 11 is in slip, the inertial mass of the internal combustion engine 1 and the torsional damper 21 is decoupled, and the bypassing of the planetary transmission 10 through the bypass shift element 12 takes place comfortably and in a manner gentle on the components, without transient shift impact. Only a little heat arises at the separating clutch 11, because the differential rotational speed at the same is low.

Thereupon, the separating clutch 11 is locked between the points in time t6 and t7. This can take place by increasing the torque transferable by the same or by decreasing the torque M-VM of the internal combustion engine 1.

Subsequently, between the points in time t7 and t8, a change to the load at the internal combustion engine 1 and the electric motor 2 takes place, specifically, in accordance with FIG. 4, an increase in the torque M-VM provided by the internal combustion engine 1 and a decrease in the torque M-EM provided by the electric motor.

Regarding the time diagrams of FIGS. 3 and 4, it should be noted that, with all turning moment curves, for reasons of simplicity, turning moments that are necessary for changes to the rotational speed based on inertial masses are not shown.

Modifications and variations can be made to the embodiments illustrated as described herein without departing from the scope and spirit of the invention as set forth in the appended claims.

REFERENCE SIGNS

1 Internal combustion engine
2 Electric motor
3 Drive assembly
4 Output
5 Transmission
6 Sub-transmission
7 Sub-transmission
8 Input shaft
9 Input shaft
10 Planetary transmission
11 Separating clutch
12 Bypass shift element
13 Shift element
14 Sun gear
15 Ring gear
16 Planetary gear
17 Planetary carrier
18 Output shaft
19 Lay shaft
20 Lay shaft
21 Torsional damper

The invention claimed is:

1. Method for operating a drive unit for a hybrid vehicle, whereas the drive unit comprises a drive assembly (3) with an internal combustion engine (1) and an electric motor (2) and a transmission (5) featuring several sub-transmissions (6, 7) shifting between the drive assembly (3) and an output (4), whereas, through a planetary transmission (10), the electric motor (2) is coupled to an input shaft (8) of a first sub-transmission (6) and an input shaft (9) of a second sub-transmission (7) shifted in parallel to the first sub-transmission (6), whereas, through a frictional-locking separating clutch (11), the internal combustion engine (1) is able to be coupled to the input shaft (8) of the first sub-transmission (6) and, if the separating clutch (11) is locked, is coupled to the same element (15) of the planetary transmission (10) together with the input shaft (8) of the first sub-transmission (6), and whereas a positive-locking or frictional-locking bypass shift element (12) works together with the planetary transmission (10) in such a manner that, with a locked bypass shift element (12), a torque-proof connection between the electric motor (2), the input shaft (8) of the first sub-transmission (6) and the input shaft (9) of the second sub-transmission (7) and thus a mandatory equality of rotational speed between the same, exist, while, with an open bypass shift element (12), this torque-proof connection between the electric motor (2) and the two input shafts (8, 9) of the two sub-transmissions (6, 7), and thus the mandatory equality of rotational speed, do not exist, characterized in that, for the execution of a power shift, shortly prior to the engagement of a positive-locking shift element to be locked for the power shift, the frictional-locking separating clutch (11) is brought into slip for the decoupling of the inertial mass of the internal combustion engine (1).

2. The method according to claim 1, wherein upon the execution of the power shift, one or both of the rotational speed of the internal combustion engine and the rotational speed of the electric motor are further adjusted prior to the build-up of slip at the frictional-locking separating clutch in such a manner that, upon the starting slip at the frictional-locking separating clutch, the positive-locking shift element to be locked for the power shift is automatically synchronized.

3. The method according to claim 1, wherein:
the bypass shift element is formed as a positive-locking or frictional-locking bypass shift element;
the actual gear of the power shift to be executed lies at the second sub-transmission; and
the target gear of the power shift to be executed lies at the first sub-transmission, to which, with a locked separating clutch, the internal combustion engine is directly connected,
wherein the following steps are carried out for the execution of the power shift:
a) initially, through a change to the load at the internal combustion engine and the electric motor, the locked bypass shift element is made load-free and is then opened without load;
b) subsequently, through a change to the rotational speed under load at the internal combustion engine and the electric motor, the rotational speed of the input shaft of the first sub-transmission is changed in the direction of the synchronous rotational speed of the target gear;
c) thereupon, through reduction in ability to transfer of the frictional-locking separating clutch, the same is brought into slip;
d) subsequently, with a synchronized positive-locking shift element of the first sub-transmission, to be locked for the power shift, the target gear is engaged;
e) thereupon, at the frictional-locking separating clutch, the slip is reduced and the same is locked; and
f) subsequently, a change to the load takes place at the internal combustion engine and the electric motor, and the actual gear of the second sub-transmission is disengaged without load.

4. The method according to claim 3, wherein, for the change to the load in step a), while keeping the torque taking effect at the output constant, the load at the internal combustion engine is reduced, and the load at the electric motor is built up.

5. The method according to claim 3, wherein in step c), by reducing the load at the internal combustion engine, the rotational speed of the same is kept approximately constant.

6. The method according to claim 3, wherein for the change to the load in step f), the load at the internal combustion engine builds up and the load at the electric motor, is reduced, whereas, subsequently, after the load-free disengagement of the actual gear of the second sub-transmission, the rotational speed of the electric motor and the rotational speed of the internal combustion engine are synchronized, and the bypass shift element is then locked.

7. The method according to claim 1, wherein:
the bypass shift element is formed as a positive-locking bypass shift element;
the actual gear of the power shift to be executed lies at the first sub-transmission; and
the target gear of the power shift to be executed lies at the second sub-transmission, to which, with a locked separating clutch, the internal combustion engine is connected indirectly through the planetary transmission;
wherein the following steps are carried out for the execution of the power shift:
a) initially, through a change to the load at the internal combustion engine and the electric motor, the shift element of the first sub-transmission to be disengaged for the power shift is made load-free and is then opened without load;
b) subsequently, through a change to the rotational speed under load at the internal combustion engine and the electric motor, the rotational speed of the input shaft of the first sub-transmission is changed in the direction of the synchronous rotational speed of the target gear;
c) thereupon, through the reduction in the ability to transfer of the frictional-locking separating clutch, the same is brought into slip;
d) subsequently, with a synchronized positive-locking bypass shift element, the same is locked;
e) thereupon, at the frictional-locking separating clutch, the slip is reduced and the same is locked; and
f) subsequently, a change to the load preferably takes place at the internal combustion engine and the electric motor.

8. The method according to claim 7, wherein in step a), the torque taking effect at the output is kept constant.

* * * * *